United States Patent

[11] 3,619,286

| | | |
|---|---|---|
| [72] | Inventor | Ludwik Gutnajer<br>Carversville, Pa. |
| [21] | Appl. No. | 784,893 |
| [22] | Filed | Dec. 18, 1968 |
| [45] | Patented | Nov. 9, 1971 |
| [73] | Assignee | The Budd Company<br>Philadelphia, Pa. |

[54] CAST GRAPHITE ELECTRODES FOR EDM APPLICATIONS
1 Claim, No Drawings

[52] U.S. Cl. .................................................. 117/226,
117/228, 117/46 CG, 117/DIG. 11, 204/290,
204/294, 23/209.1, 23/209.4
[51] Int. Cl. .................................................. C01b31/04,
H01m 13/02

[50] Field of Search .......................................... 117/226,
228; 204/290, 294; 23/209.1, 209.4

[56] References Cited
UNITED STATES PATENTS

| | | | |
|---|---|---|---|
| 2,789,038 | 4/1957 | Bennett et al. ............... | 23/209.1 |
| 3,314,865 | 4/1967 | Kleinpeter et al. ............ | 204/294 X |
| 3,317,338 | 5/1967 | Batchelor ..................... | 117/46 |

*Primary Examiner*—William L. Jarvis
*Attorneys*—Thomas I. Davenport, Edward M. Farrell, Alford L. Trueax, Jr. and William R. Nolte

ABSTRACT: A no-wear graphite electrode for electrodischarge machining. The electrode is cast from powdered graphite mixed with a binder. The mixture is cast in a mold and subsequently fired. After firing, it is coated with pyrolytic graphite.

CAST GRAPHITE ELECTRODES FOR EDM APPLICATIONS

SPECIFICATION

This invention relates to electro-discharge machining, often known as EDM, and embraces the art of forming tools and dies by electrolytically removing portions of the surface of a blank stock of material.

Broadly, such techniques utilize the surface erosion of electrodes immersed in an electrolyte. The reader will recognize that if an electrode in such an environment could be made to erode in a controller manner, then at the conclusion of the process one would have a tool or die of the desired configuration without recourse to the usual milling and machining processes. According to the current state of knowledge in this field, EDM may be described as a process of machining defined by a controlled wearing away or erosion of an electrode by recurring spark discharges between the electrodes in a dielectric fluid. In general, the process involves the building up of a voltage between two electrical conductors (electrodes) one of which is to be formed into a desired configuration. The electrodes are separated a small distance and the space between the facing surfaces filled with the dielectric fluid.

It has been found that a graphite rod or block may be machined to the desired tool surface configuration. However, such machining is rather costly, particularly where complex configurations or shapes are involved. Further, the volume of the finished or machined electrode is often only about one-half of its initial volume, the remainder representing wasted material. In order to overcome these disadvantages, workers in this art have turned to the casting of graphite electrodes. According to this process, powdered graphite is mixed with a suitable binder, cast into the desired shape and then fired. However, these steps alone were found to yield a graphite electrode not entirely satisfactory. When conducting tests with such cast electrodes, it has been observed that particles of graphite become detached from the body of the electrode. These particles had diameters greater than a small fraction of the working gap distances and produced undesirable electrical shortings. Increasing the rate of flow of the dielectric fluid in order to promptly remove such detached particles produced little or no improvement. Efforts were also undertaken to improve the tensile characteristics of the cast graphite by the inclusion of metallic powders as binders in order to hold the graphite particles in a matrix. However, testing revealed that the same conditions as before were obtained, the same as wherein only graphite powders were used. In other cases, a phenolic binder or resin was used. Various powder supplies and dielectric fluids and combinations of them were attempted in order to overcome the above-noted difficulty. Microscopic studies of the graphite electrode revealed that the carbon was being removed during the EDM process, leaving a structure which was a hollow matrix of the resin or phenolic binder material.

The problem of carbon material removal was at least partially solved by workers in this art by impregnation of cast graphite electrodes with pyrolytic graphite. Briefly, this process requires the following steps. The molded electrode in its unfinished or green state is placed into a furnace, and a hydrocarbon atmosphere may be introduced into the furnace upon the attaining of a required temperature. The phenol binder, such as a phenol-formaldehyde resin, is carbonized during the initial heating process. This leaves the graphite particles bonded together by a carbon skeleton, the skeleton being the residium of the resin. Hydrocarbon vapor generated by the heating process becomes diffused into the interstices of the graphite and upon attainment of the desired temperature the hydrocarbon is cracked and free carbon produced. This results in still further carbon being deposited in the pores or interstices. This deposit is termed pyrolytic carbon and functions as the binding agent for maintaining the graphite particles together. This process changes the physical properties of the graphite electrode, as for example, by increasing the transverse strength 2,500 p.s.i. to 6,000 p.s.i. The density is also increased and the electrical resistivity diminished.

One of the disadvantages attendant the above-described method of fabricating graphite electrodes is that rather high pressures are required to make the initial casting. This requires metallic molds or molds made of plastic which in turn have to be supported in order to withstand pressures used.

According to the practice of the present invention, a well-known property of oils capable of film formation is used for binding graphite particles. Drying oils such as oiticica, tug or linseed oil can be used as a fluid binder, the compacting of the material into the plastic mold being accomplished by hand pressure. Thus, compacting at high pressure is omitted which eliminates fabrication of metallic molds or supports for plastic molds. The electrode molding composition of the present invention has the following general formula:

| Graphite Powder | 70–80% by weight |
| Binders | 30–20% by weight |

The use of graphite powder exhibiting a wide particle size range, i.e., 40–200 mesh, increases the mechanical strength of the resultant electrode.

The following example will illustrate the features of the invention. The first step involves casting of the graphite to the desired shape and the following table will illustrate the several materials employed and their proportions.

TABLE I

Dry Ingredients—Graphite Powders 94%

| Sieve Size Mesh/in. | Machine Fines Weight Retained |
| --- | --- |
| 40 | 8.8 |
| 60 | 12.1 |
| 80 | 11.2 |
| 200 | 53.7 |
| Pan | 5.0 |

Dextrin—6% of dry ingredients
Fluid Binder—Linseed Oil—20 g. per 100 g. of dry ingredients
Carbowax 4,000—10% of Linseed Oil by weight As a first step, any lumped materials are removed and the dry materials completely blended together. Next, the fluid binder defined by the raw linseed oil is heated to approximately 100° C. and mixed with the carbowax 4,000. Next, the liquid binder is heated to a temperature just below its boiling point, this being approximately 450° F. This step permits a partial polymerization of the linseed oil, which in turn works for shorter curing cycles and green molds of greater strength. The fluid binder is then cooled to 212° F.

A mixing step now follows, with the fluid binder at the 212° F. temperature being mixed with the dry ingredients. The mulling operations are conducted to an even consistency.

The molding step is next and the mandrel or mold which may be formed of an epoxy material is coated with a parting agent such as polyvinyl alcohol. The mulled material is pressed by hand into the molds and holes are formed in the material to facilitate curing and to prevent cracks during subsequent operations. The entire assembly, comprising the mold with the material in it, is now placed in a drying oven at 200° F. for a time dependent on the cross section of the cast. The casting is now removed from the mold and a firing step follows. As the initial firing step, the casting is placed into a box which is fitted with a graphite cover. The assembly is now placed in a furnace at 400° F. and the temperature raised in stages of 200° F. in an inert atmosphere such as argon. At temperatures of between 930° F.–1,300° F. carbonization of the binders takes place and the temperature of 1,300° F. should be maintained until the container holding the casting ceases giving off smoke. Thereafter, the temperature further is in-

TABLE II.—EDM ELECTRODES TEST

| Electrode material | Work material | Dielectric fluid | Frequency, kc. | Amperes | Volts | Electrode performance | Metal removal rates, ins./m./a. |
|---|---|---|---|---|---|---|---|
| Cast graphite with pyroytic facing | Cast iron | Spindle oil | 4 | 30 | 30 | Non-wear | .019 |
| Machined graphite | do | do | 4 | 55 | 30 | do | .019 | creased to 1,750° F. and held there for approximately 1 hour. The furnace is then shut off and the mold is removed at a temperature of 400° F.

The last step in the process is the finishing of the graphite cast and comprises the step of pyrolytic coating. In general, the pyrolytic graphite is deposited at a temperature of 3,100° F. at a rate of approximately 0.001 inch per hour, a total thickness of approximately 0.005 inches.

The pyrolytic faced cast graphite above described compared favorably in performance with a standard machined graphite electrode. The pyrolytic graphite coating is observed to have a density approximately 2.2 times the density of cast graphite.

The following table illustrates the favorable performance of the subject cast graphite electrodes as compared to machined graphite electrodes.

What is claimed is:

1. A method of forming a nonwear graphite electrode comprising the steps of casting under a pressure lower than 150 p.s.i. in a plastic mandrel graphite powder including a binder to a predetermined electrode shape, the ratio of said binder being approximately 20 grams for each 100 grams of graphite powder, and coating the cast graphite electrode with a layer of pyrolytic graphite.

* * * * *